Dec. 3, 1968  W. J. SUTHERLAND  3,414,113
CONVEYOR FOR PNEUMATIC TIRE TREAD PIECES
Filed Oct. 14, 1965  2 Sheets-Sheet 1

INVENTOR.
WALTER J. SUTHERLAND
BY
Robertson, Smythe, Bryan & Parmelee
ATTORNEYS.

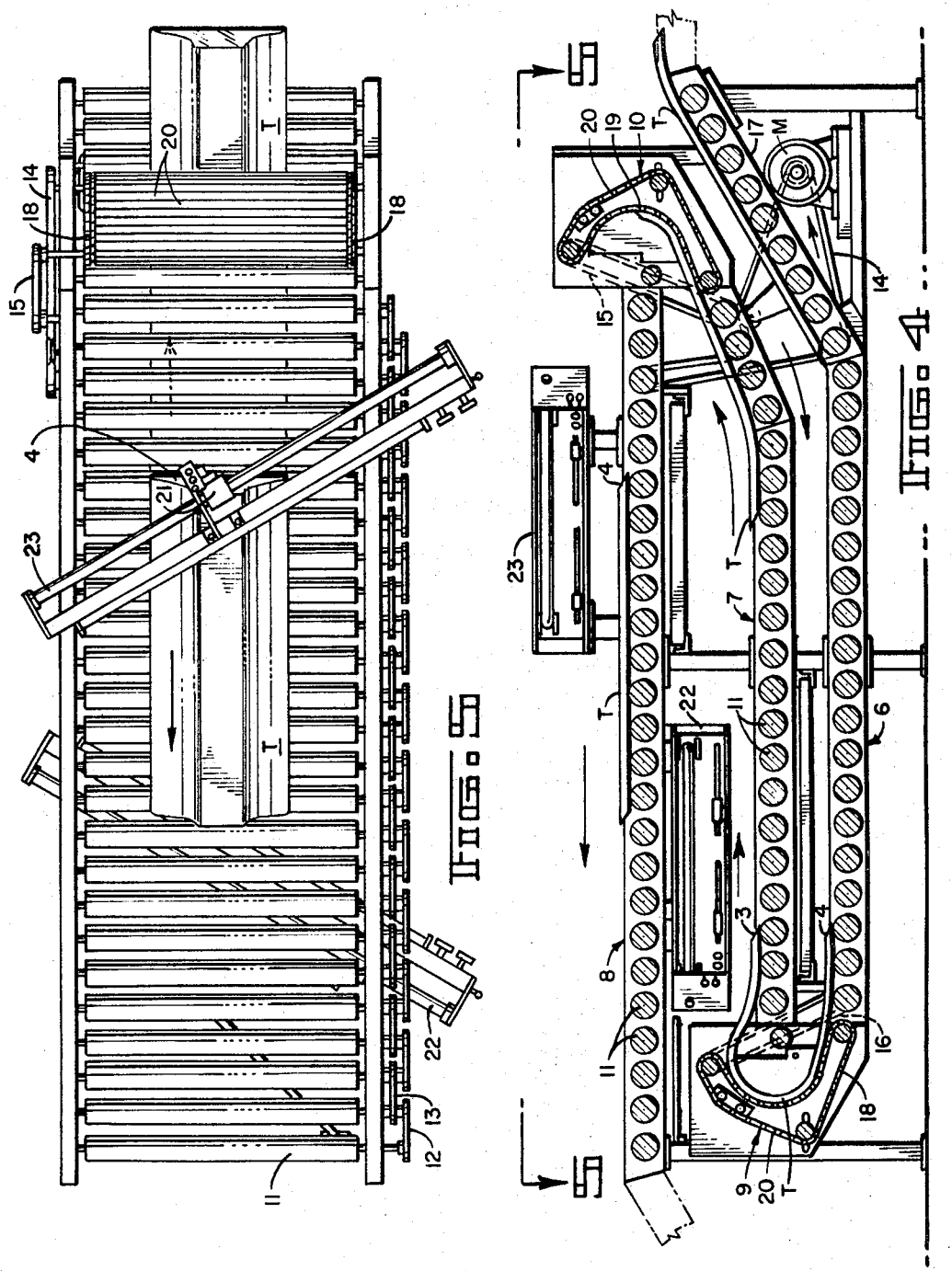

United States Patent Office 3,414,113
Patented Dec. 3, 1968

3,414,113
CONVEYOR FOR PNEUMATIC TIRE
TREAD PIECES
Walter J. Sutherland, Weston, Conn., assignor to Spadone Machine Company, Inc., Norwalk, Conn., a corporation of New York
Filed Oct. 14, 1965, Ser. No. 496,053
1 Claim. (Cl. 198—84)

ABSTRACT OF THE DISCLOSURE

A conveyor machine for handling a wide range of sizes and weights of pneumatic tire tread pieces without adjustment wherein the tread pieces are subjected to a uniform gentle undulating and turn-around action stabilizing the tread by working the rubber while the tread pieces are in a relaxed state, thus relieving stresses in the extruded tread. The conveyor is characterized by open accessible vertically stacked conveyor sections and open accessible turn-around sections. The vertically stacked conveyor sections include a series of rollers whose rotation is synchronized, while the turn-around conveyors include a pair of spaced chains with strips forming flights extending between the chains which are guided along curved paths, these turn-around conveyors being open toward the inside of the turns for allowing the tread piece to move onto the succeeding conveyor section in a relaxed state.

---

The invention relates to the handling of tread pieces during the application of cement to their skived ends and before the treads are assembled with the carcasses or bodies of the tires and placed in the molds.

It has been common practice throughout the tire industry to apply cement to the ends of tread pieces after they have been cut to length by the tread skiver. The tread piece is a flat elongated body which ordinarily is delivered to the cementing station lying flat with its tread up. In this position, one skived end faces upwardly and the other downwardly. For convenient application of cement to the downwardly facing skived end, this end is lifted up and folded over. In doing this, the tread piece is folded back on itself in a manner which brings its two skived ends together with their surfaces aligned and both skives facing up to receive the cement. The folding of the tread is performed either manually or by machine. In either case the folded tread piece remains in its folded state during application of the cement, and ordinarily the tread continues down the processing line in such folded state. The tread when folded is distorted within the restricted area of the bend and remains in such distorted state for an appreciable length of time. This is believed to have a deleterious effect. Uniformity of tread thickness may be affected, and this in turn can create an uneven distribution of weight, contributing to the problem of imbalance in the finished tire.

I have found a solution to these difficulties as comprised in a new method and apparatus for preparing tread pieces for application to the tire bodies which eliminates the need to bend the tread back on itself or to hold it in a folded state. According to my invention the tread, instead of being folded at the cementing station, is subjected only to a uniform and gentle undulating and turning-over action which is considered beneficial in stabilizing the tread through working of the rubber while the tread piece is kept in a relaxed state. The undulating action is uniform throughout the length of the tread and will tend to relieve stresses in the extruded tread.

Summary

My invention resides in a method and apparatus for preparing a tread piece for application to a tire body as applied in the general process of manufacturing pneumatic tires for vehicles which includes separately preparing the tire body and a tread piece therefor, the tread piece being in the form of a flat elongated body having skived ends adapted to be cemented together on a bias upon application of the tread piece to the tire body, one skived end facing upwardly and the other skived end facing downwardly when the tread piece is lying flat with its tread up. As applied to such general tire making process, my invention includes the steps and means for moving the tire piece longitudinally:

a. In a forward direction while lying flat with one of its skived ends facing upwardly, then
b. In a first curved path while flexing the tread piece in a manner which causes it to curve backwardly for movement in a reverse direction, then
c. In said reverse direction while lying flat with the other of its skived ends facing upwardly, then
d. In a second curved path while flexing the tread piece in a manner which causes it to curve forwardly for movement in a forward direction, and again
e. In the forward direction while lying in the position described in a above.

Such steps and means combine to produce the aforesaid gentle undulating action while the rubber of the tread piece is kept in a relaxed state. Also they combine to allow adhesive to be applied first to one upwardly facing skived end and then to the other without bending the tread piece tightly back on itself as required by past practice. All this is accomplished without increasing the net forward movement of the tread piece so that space requirements for the method and machine are not any greater than those encountered in the past practice; that is, the foregoing benefits are secured without making the production line any longer than before.

Description

I shall now describe the best mode contemplated by me for carrying out my invention, referring to the accompanying drawings in which:

FIG. 4 is a vertical longitudinal sectional view of apparatus constructed in accordance with my invention.

FIG. 5 is a plan view of the apparatus of FIG. 4 taken as indicated at 5—5 in FIG. 4.

Figure 1:
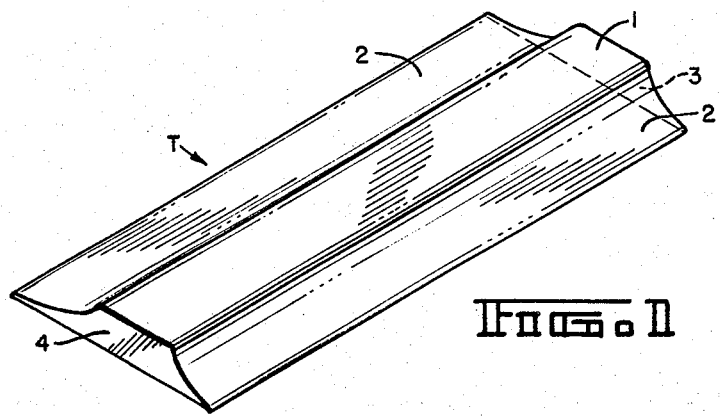
FIG. 1 is an isometric view of a tread piece for an automobile tire, such being representative of the kind of tread piece which is used in practicing my invention.
Figure 2:
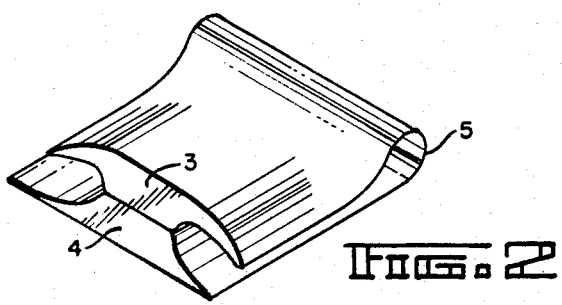
FIG. 2 is a similar view, showing the tread piece of FIG. 1 bent back on itself.

The representative tread member T shown in FIGS. 1 and 2 has been shown in the relative proportions that would correspond to those of a tread member 52″ long, 20″ wide and having a tread 6″ wide. It has a raised tread portion 1 and edge portions 2 containing the rubber or composition that ultimately will form the outer side wall sections of the finished tire. Lying flat with its tread up, member T has one skived end 3 facing downwardly and the other skived end 4 facing upwardly. Bent back on itself as in FIG. 2, both skived ends face upwardly so that adhesive or cement can be brushed or sprayed on them, but only at the expense of cramping and distorting the tread at the resulting bend 5. What I do instead of this is to produce a gentle and uniform undulating action as by means of a turn-around conveyor, turning the tread over on its back and again turning it right side up while the rubber of the tread is allowed to remain in a more or less relaxed state. This produces a flexing which is uniform throughout because the point of flexure flows continuously along the entire length of the tread. The sequence of the operating steps is shown schematically in FIG. 3 in which the leading end of the tread piece is darkened to help in following the changes in orientation. The letters a, b, c, d and e key the diagram to the similarly designated steps in the *Summary* above, and the arrows show directions of movement.

My preferred form of apparatus comprises three conveyor sections 6, 7 and 8 stacked vertically, with two turn-around means 9 and 10 open toward the inside of the turns. As shown, the conveyor sections each includes a series of rollers 11 whose rotation is synchronized by means of interconnecting driving belts 12 and 13, the entire conveyor and turn-around system being driven by belts 14, 15 and 16 from a suitable power source such as a motor M. The entering portion of conveyor section 6 may advantageously be inclined downwardly as at 17 to reduce the stacked height of the conveyor sections and provide easy access to the equipment for applying cement to the ends of the tread pieces. Turn-around means 9 and 10 each comprises a pair of spaced drive chains 18 carried around a drive sprocket and idler wheels and guided on their inner courses by a pair of cams 19. Elongated strips or flights 20 are secured at their ends to each chain 18 of the spaced drive chains.

Figure 3:
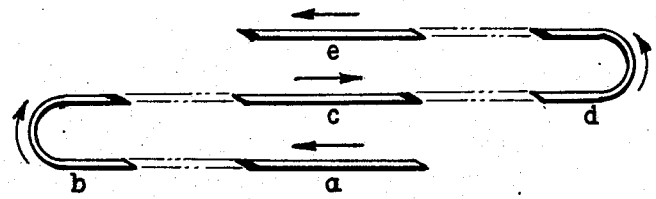
FIG. 3 is a diagram showing the sequence of steps performed according to my improved method of operation.

This arrangement of stacked conveyor sections and turn-around means serves to produce the gentle undulating action I have described with reference to FIG. 3, without increasing the net forward movement of the tread piece from the beginning to the end of the method and without increasing the length of the machine. Further, this arrangement allows adhesive to be applied first to one upwardly facing skived end of a tread piece and then to the other end without resorting to the undesirable former practice of bending the rubber back on itself in a manner to distort the tread. In my apparatus as shown, the adhesive is applied to the leading end 3 of the tread piece by means of a traveling spray gun 21. Gun 21 is driven along a boom 22 arranged at an angle to the path of travel of the tread piece T and extending over conveyor section 7. A second gun 21 is driven along another boom 23 similarly arranged above conveyor section 8 for applying adhesive to the trailing edge 4 of the tread piece. The spray guns, booms and actuating mechanism therefor may be of conventional construction and form no part of the present invention. Any well known spray gun apparatus may be used or the adhesive may be applied manually by brushing or otherwise.

A wide range of sizes and weights of tread pieces can be handled by my machine and method without any adjustments being required other than those which control the action and positions of the automatic spray guns. No adjustment is needed for varying lengths of treads.

The terms and expressions which I have employed are used in a descriptive and not a limiting sense, and I have no intention of excluding equivalents of the invention described and claimed.

I claim:

1. A conveyor machine for handling a wide range of sizes and weights of pneumatic tire tread pieces in a relaxed state without any adjustment of the conveyor machine being required, said conveyor machine comprising
   (a) a first conveyor section including a series of rollers and drive means for rotating said rollers in synchronized rotation for conveying the tread piece longitudinally in a forward direction while lying flat in a relaxed state,
   (b) a first turn-around conveyor extending upwardly from said first conveyor section for conveying the tread piece longitudinally upwardly in a first curved path while flexing the tread piece in a manner which causes the tread piece to curve upwardly and backwardly for movement in a reverse direction,
   (c) said first turn-around conveyor including a pair of spaced drive chains having elongated strips extending between and secured to said chains, said chains being guided along said first curved path and said turn-around conveyor being open toward the inside of the curved path,
   (d) a second conveyor section stacked vertically above said first conveyor section, said second conveyor section including a series of rollers and drive means for rotating said rollers in synchronized rotation for conveying the tread piece longitudinally in the reverse direction while lying flat in a relaxed state,
   (e) a second turn-around conveyor extending upwardly from said second conveyor section for conveying the tread piece longitudinally upwardly in a second curved path while flexing the tread piece in a manner which causes the tread piece to curve upwardly and backwardly for movement again in said forward direction,
   (f) said second turn-around conveyor including a pair of spaced drive chains having elongated strips forming conveyor flights extending between and secured to said chains, said chains being guided along said second curved path and said turn-around conveyor being open toward the inside of said second curved path, and
   (g) a third conveyor section stacked vertically above said second conveyor section, said third conveyor section including a series of rollers and drive means for rotating said rollers in synchronized rotation for conveying the tread piece longitudinally in said forward direction while lying flat in a relaxed state, by virtue of all of which an undulating action is produced which is uniform throughout the length of the tread piece at the point of flexure flows continuously along the entire length of the tread piece which is beneficial in stabilizing the tread through working of the rubber while the tread piece is kept in a relaxed state to relieve stresses in the extruded tread.

References Cited

UNITED STATES PATENTS

| | | | |
|---|---|---|---|
| 1,578,617 | 3/1926 | Van Houten | 198—84 |
| 1,919,275 | 7/1933 | Dunham | 198—84 |
| 3,147,137 | 9/1964 | Glass et al. | 117—68 X |
| 3,243,182 | 3/1966 | Dexter et al. | 271—76 X |

ALLEN N. KNOWLES, *Primary Examiner.*